United States Patent
Taylor

(10) Patent No.: US 8,235,341 B2
(45) Date of Patent: Aug. 7, 2012

(54) WALL MOUNTING DEVICE

(75) Inventor: Rich Taylor, Xenia, OH (US)

(73) Assignee: Parts Express International, Inc., Springboro, OH (US)

( * ) Notice: Subject to any disclaimer, the term of this patent is extended or adjusted under 35 U.S.C. 154(b) by 135 days.

(21) Appl. No.: 12/688,379

(22) Filed: Jan. 15, 2010

(65) Prior Publication Data

US 2011/0174939 A1 Jul. 21, 2011

(51) Int. Cl.
*E04G 3/00* (2006.01)

(52) U.S. Cl. ............... 248/292.14; 248/201; 248/274.1; 248/291.1; 248/917

(58) Field of Classification Search ............... 248/201, 248/274.1, 917–923, 292.14, 294.1, 298.1; 361/679.01
See application file for complete search history.

(56) References Cited

U.S. PATENT DOCUMENTS

| | | | |
|---|---|---|---|
| 7,178,755 B2 | 2/2007 | Hsu et al. | |
| D538,140 S * | 3/2007 | Ly Hau et al. | D8/373 |
| D539,637 S * | 4/2007 | Ly Hau et al. | D8/373 |
| 7,334,766 B2 * | 2/2008 | Ligertwood | 248/292.13 |
| 7,395,996 B2 | 7/2008 | Dittmer | |
| 7,438,269 B2 | 10/2008 | Pfister et al. | |
| 7,441,739 B2 * | 10/2008 | Huang | 248/292.14 |
| D595,702 S * | 7/2009 | Bremmon et al. | D14/239 |
| 7,669,820 B2 * | 3/2010 | Tien | 248/222.13 |
| 2006/0065800 A1 * | 3/2006 | Bremmon | 248/274.1 |
| 2007/0029457 A1 * | 2/2007 | Baek | 248/372.1 |
| 2010/0309615 A1 * | 12/2010 | Grey et al. | 361/679.01 |

* cited by examiner

*Primary Examiner* — Amy J Sterling

(74) *Attorney, Agent, or Firm* — Wood, Herron & Evans, LLP

(57) ABSTRACT

A wall mounting device for a flat panel display includes a wall bracket and a mounting bracket. The wall bracket is adapted to be directly coupled to a wall and includes a top rail and a bottom rail. The mounting bracket is adapted to be coupled to the flat panel display, and includes first and second plate members connected to each other and defining an upper end and a lower end. At the upper end, the mounting bracket includes a hook to engage the top rail of the wall bracket. At the lower end, the mounting bracket includes a spring clip that selectively engages the bottom rail of the wall bracket.

5 Claims, 5 Drawing Sheets

WALL MOUNTING DEVICE

TECHNICAL FIELD

This invention generally relates to wall mounting devices and, more particularly, to wall mounting devices for flat panel televisions, computer monitors or the like.

BACKGROUND

Flat panel televisions and computer monitors have largely replaced conventional cathode ray tube (CRT)-based televisions and computer monitors. Although flat panel televisions and monitors (hereinafter "flat panel displays") have reduced the size and weight-bearing requirements of entertainment center furniture and other conventional cabinetry, many consumers have started mounting these flat panel displays to the walls of their homes and businesses to remove the need for entertainment center furniture and related cabinetry entirely. Consequently, wall mounting devices have grown in popularity as consumers replace older CRT televisions and monitors with flat panel displays.

Conventional wall mounting devices include at least two components: a wall bracket adapted to be coupled to the wall, and one or more mounting brackets adapted to be coupled to the flat panel display. These wall mounting devices typically allow an end consumer to mount the flat panel display in just a few steps. First, the consumer attaches the wall bracket to wall studs or other load bearing surfaces on a wall. Next, the consumer couples the mounting bracket(s) directly to the flat panel display, such as via pre-formed threaded apertures formed in the flat panel display. The consumer then couples the mounting brackets to the wall bracket, thereby completing the mounting of the flat panel display to the wall.

Conventional wall mounting devices may be fixed mounts that lock the flat panel display in one orientation, or tilting mounts that allow tilting or swiveling of the flat panel display with respect to the wall to provide varying inclination angles for the flat panel display. In conventional tilting mounts, the mounting brackets include a display bracket coupled to the flat panel display and a hanging bracket adapted to removably couple the display bracket to the wall bracket. The hanging bracket is generally coupled with the display bracket during the manufacturing of the wall mounting device to form a one-piece mounting bracket for the end consumer. The hanging bracket is pivotally coupled to the display bracket to provide the tilting function once the mounting bracket has been engaged with the wall bracket.

The wall bracket of conventional wall mounting devices typically includes a support plate with a top rail and a bottom rail, the top and bottom rails spaced forward from the support plate to extend away from the wall. The mounting brackets typically include a rigid hook on an upper end to engage the top rail of the wall bracket. Conventional mounting brackets also include a retractable screw or bolt on a lower end which may be threadably retracted to allow the mounting bracket to slide over the bottom rail of the wall bracket. After the mounting brackets are positioned on the top and bottom rails, the retractable screw or bolt may be advanced to engage the bottom rail and thereby block the lower ends of the mounting brackets from pulling away from the wall bracket.

However, the use of a retractable screw or bolt has certain drawbacks. If the flat panel display is tilted abruptly or jostled, the retractable screw or bolt may damage the threaded aperture in the mounting bracket, thereby loosening the lower end of the mounting bracket and providing a potentially unstable mount for the flat panel display. Furthermore, the mounting brackets are typically located closer to the center of a flat panel display than the side edges, which places these retractable screws or bolts in very hard-to-reach locations. The minimal clearance between the flat panel display and the wall may lead to difficulties in trying to access and rotate the retractable screws or bolts with adult hands or suitable tools. This may encourage an end consumer to leave the screws and bolts unengaged, which provides a situation where the lower ends of the mounting brackets are not secured and may freely move off the wall bracket. Furthermore, consumers often forget to fully retract the screws or bolts before lifting the flat panel display onto the wall bracket, and the screws or bolts then prevent proper seating of the mounting brackets on the wall bracket. The flat panel display must then be removed from the wall to retract the screws and lifted onto the wall again, which can be a frustrating and arduous task for the consumer.

Thus, it would be desirable to provide a wall mounting device that addresses these and other shortcomings of conventional wall mounting devices.

SUMMARY

One embodiment of a wall mounting device for a flat panel display includes a wall bracket and a mounting bracket. The wall bracket is adapted to be directly coupled to a wall and includes a top rail and a bottom rail. The mounting bracket is adapted to be coupled to the flat panel display, and includes first and second plate members connected to each other and defining an upper end and a lower end. At the upper end, the mounting bracket includes a hook to engage the top rail of the wall bracket. At the lower end, the mounting bracket includes a spring clip that selectively engages the bottom rail of the wall bracket. The spring clip includes a locking slot that may snap into engagement with the bottom rail to properly mount the flat panel display on the wall.

The spring clip of the wall mounting device may include a body member, a handle, and a torsion spring. The body member includes an upper surface defining the locking slot which engages the bottom rail of the wall bracket. The upper surface of the body member may also include a cam surface extending behind the locking slot, the cam surface configured to guide the bottom rail of the wall bracket into the locking slot. The torsion spring biases the locking slot towards the bottom rail of the wall bracket. The body member also includes first and second opposed sidewalls and a front wall extending between the first and second opposed sidewalls. The first and second opposed sidewalls are disposed inboard of the first and second plate members of the mounting bracket. The handle of the spring clip may be an L-shaped tab extending below the first and second opposed sidewalls and outboard of one of the first or second plate members of the mounting bracket.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
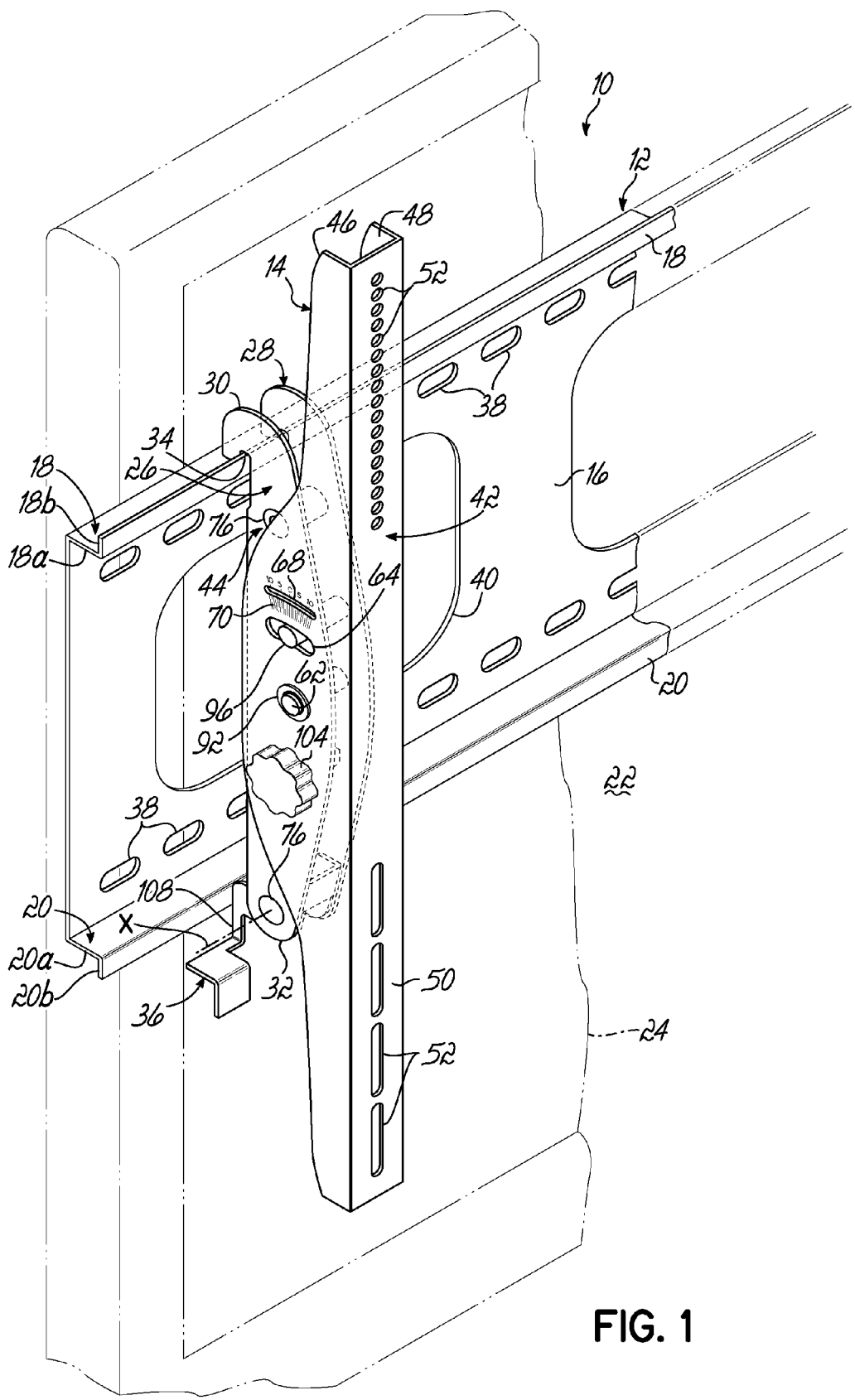
FIG. 1 is a partially cut-away perspective view of a wall mounting device in accordance with one embodiment of the invention.

Referring now to the figures, an exemplary embodiment of a wall mounting device 10 is illustrated in FIGS. 1-4. As shown in FIG. 1, the wall mounting device 10 includes a wall bracket 12 and one or more mounting brackets 14. The wall bracket 12 includes a support plate 16, a top rail 18, and a bottom rail 20, and is configured to be rigidly coupled to a wall 22 with lag bolts or any other appropriate load-bearing connecting member (not shown). The mounting brackets 14 are configured to be coupled to a flat panel display 24 (shown in phantom) of a television, a computer monitor, or some other similar display with threaded connectors (not shown). Each of the mounting brackets 14 includes first and second plate members 26, 28 which may be generally parallel and connected to each other, and which define an upper end 30 and a lower end 32 of the mounting bracket 14. The upper end 30 of each mounting bracket 14 includes a generally J-shaped catch or hook 34 formed in the first and second plate members 26, 28. The lower end 32 of each mounting bracket 14 includes a spring clip 36 disposed between the first and second plate members 26, 28. In the mounted position of FIG. 1, the hook 34 is engaged with the top rail 18 of the wall bracket 12 and the spring clip 36 is engaged with the bottom rail 20 of the wall bracket 12, thereby mounting the flat panel display 24 to the wall 22.

Figure 2:
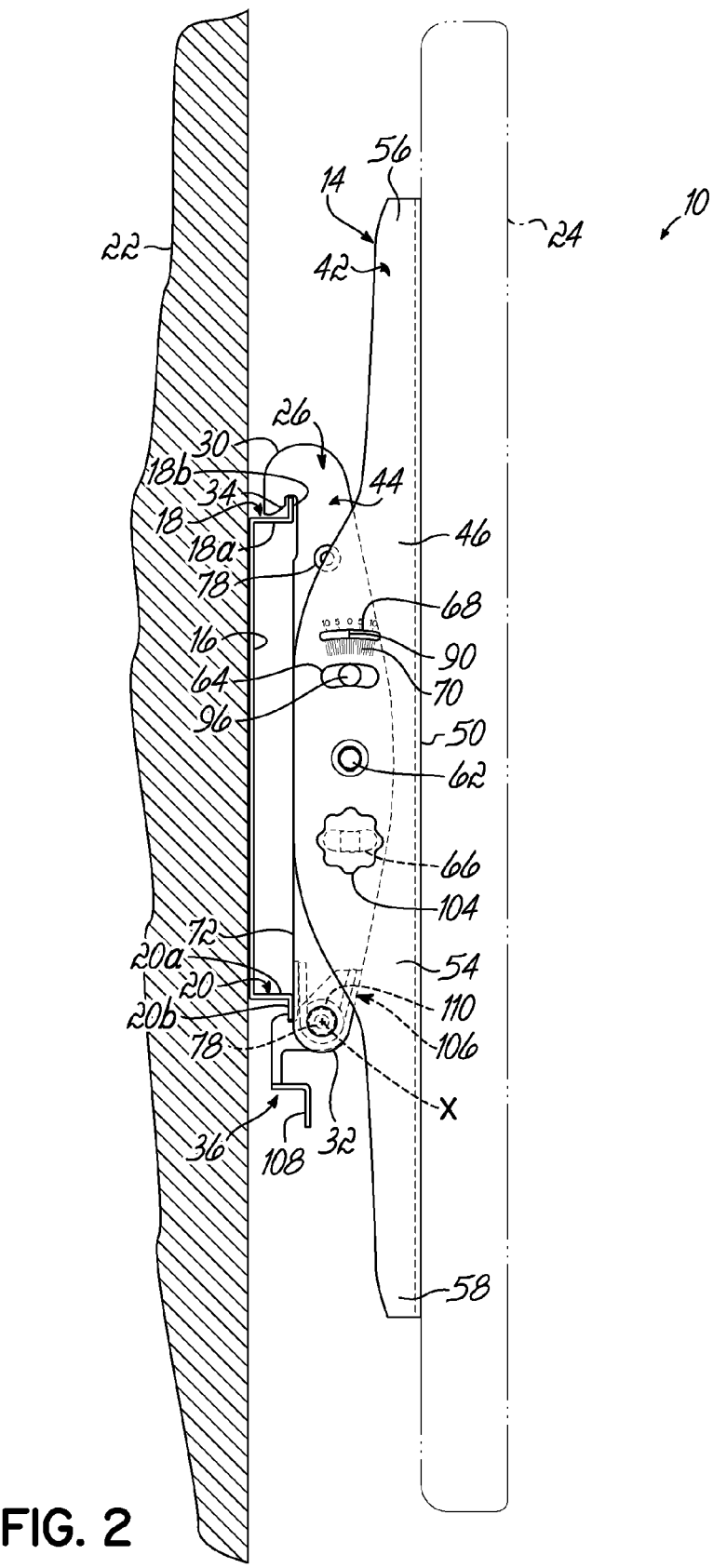
FIG. 2 is a side view of the wall mounting device of FIG. 1.

The wall bracket 12 is illustrated in detail in FIGS. 1 and 2. The wall bracket 12 may be formed of a rigid material such as metal, or more specifically, steel. The support plate 16 extends in a generally transverse direction flush to the wall 22 and includes a plurality of elongate apertures 38 configured to receive mounting lag bolts or the like to secure the wall bracket 12 to wall 22. The support plate 16 may also include a series of larger apertures 40 adapted to reduce the weight and material used to form the wall bracket 12. The top rail 18 has an L-shape configuration, a first leg 18a which projects generally forward of the support plate 16, and a second leg 18b which projects generally upwardly. In a similar manner, the bottom rail 20 has an L-shape configuration, a first leg 20a which projects generally forward of the support plate 16, and a second leg 20b which projects generally downwardly. The top and bottom rails 18, 20 are configured to engage the mounting brackets 14 so as to secure the flat panel display 24 to the wall 22.

Figure 3:
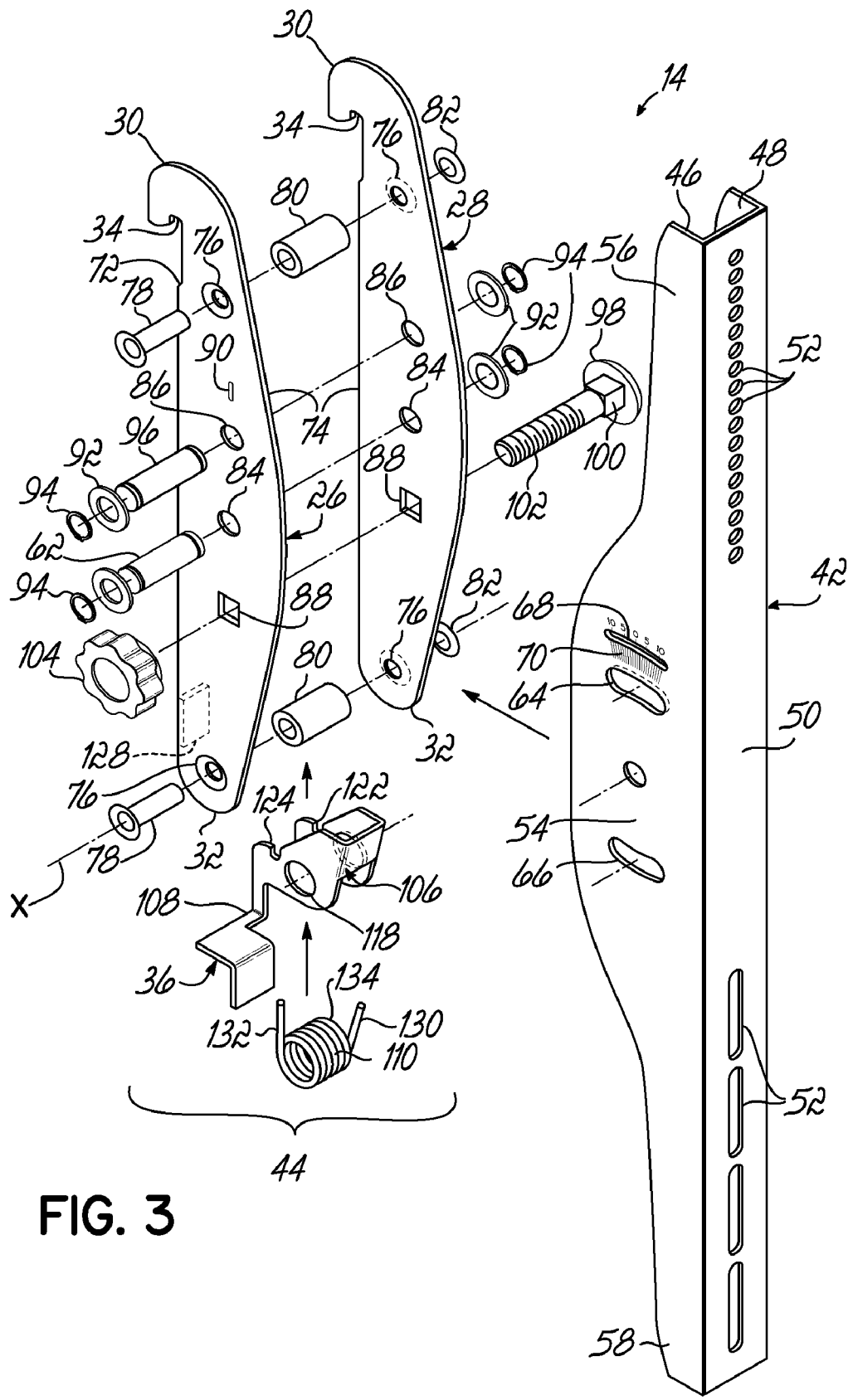
FIG. 3 is an exploded view of the mounting bracket of the wall mounting device of FIG. 1.
Figure 4:
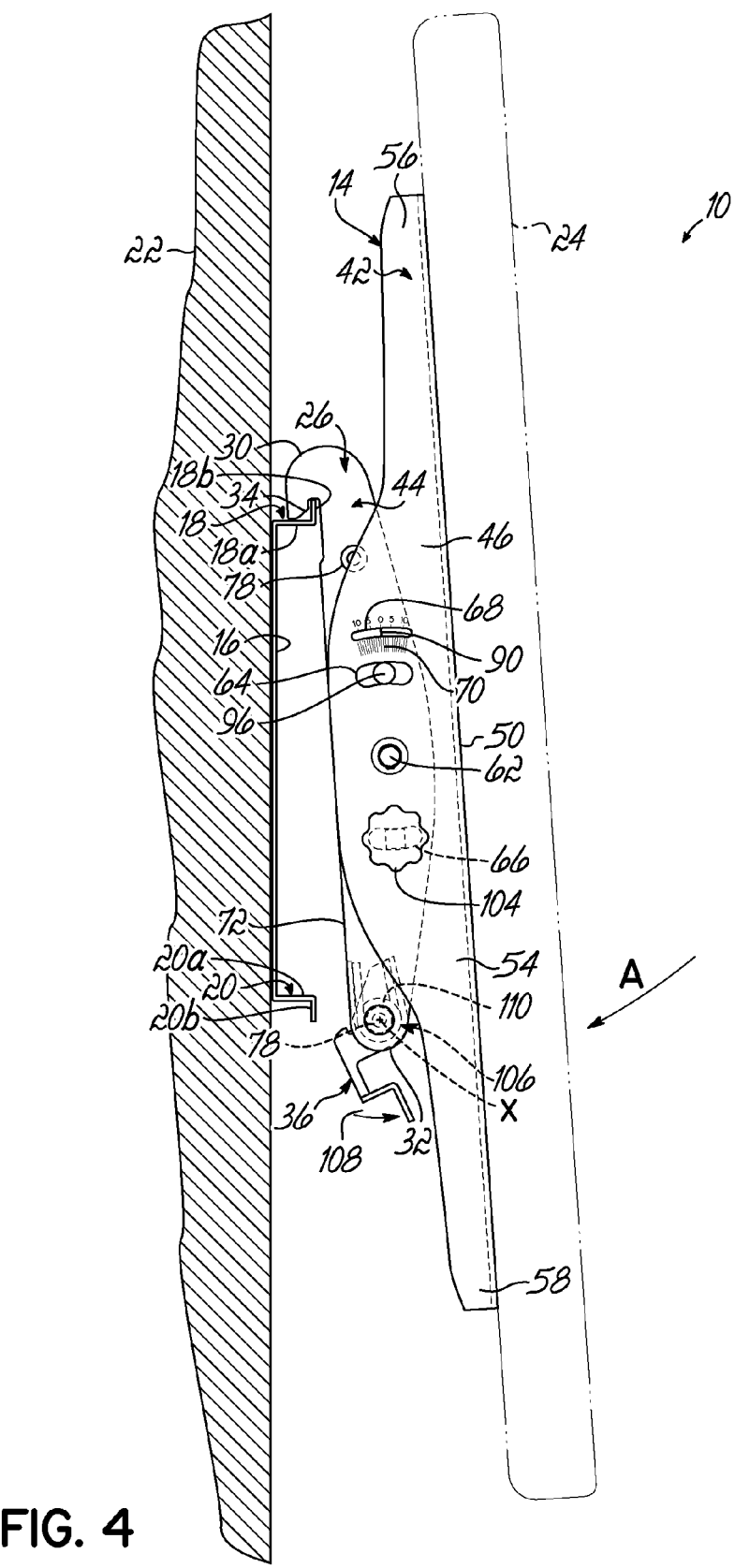
FIG. 4 is a side view of the wall mounting device of FIG. 1, shown in a position prior to mounting.

One of the mounting brackets 14 is shown in more detail in FIGS. 2-4, and more specifically, in the exploded view of FIG. 3. The mounting bracket 14 of the exemplary embodiment is a tilt mount adapted to provide pivoting of the flat panel display 24 with respect to the wall 22. It will be appreciated that the mounting bracket 14 may be a fixed mount in alternative embodiments. As shown in FIG. 3, the mounting bracket 14 includes a display bracket 42 and a hanging bracket 44. The display bracket 42 is configured to couple to the flat panel display 24, while the hanging bracket 44 is configured to couple the display bracket 42 to the wall bracket 12. Although most flat panel displays 24 require two mounting brackets 14 for mounting on the wall mounting device 10, the mounting brackets 14 are generally identical and only one mounting bracket 14 is illustrated and described below. It will be appreciated that fewer or more mounting brackets 14 may be used in accordance within the scope of the invention.

The display bracket 42 includes first and second sidewalls 46, 48 and a front mounting surface 50 extending between the first and second sidewalls 46, 48 such that the display bracket 42 has a generally U-shaped configuration. The front mounting surface includes a plurality of apertures 52 configured to accept threaded bolts (not shown) that engage threaded apertures provided on the rear side of many flat panel displays 24. It will be appreciated that other types of appropriate connectors may be inserted through apertures 52 depending on the mounting provisions offered on the flat panel display 24. The first and second sidewalls 46, 48 project behind the front mounting surface 50 and may vary in width along the length of the display bracket 42. For example, in one embodiment the width of the first and second sidewalls 46, 48 is greater in a central portion 54 than adjacent the ends 56, 58 thereof. At the central portion 54, the first and second sidewalls 46, 48 include a central aperture 60 configured to receive a pivot pin 62 to be described in detail below. Also within the central portion 54, the first and second sidewalls 46, 48 include a first arcuate slot 64 above the central aperture 60 and a second arcuate slot 66 below the central aperture 60. The first and second arcuate slots 64, 66 generally define part of a circle centered at the central aperture 60. The first and second sidewalls 46, 48 further includes a radial viewing slot 68 disposed above the first arcuate slot 64 and facing outwardly in each transverse direction. The radial viewing slots 68 may be surrounded by a plurality of marks forming a degree scale 70, as will be described in detail below.

As described above, the hanging bracket 44 includes the first and second plate members 26, 28, the hook 34, and the spring clip 36. The first and second plate members 26, 28 include generally flat back edges 72 except for the hook 34 at the upper end 30 thereof. Between the upper and lower ends 30, 32, the first and second plate members 26, 28 may vary in width along the length of the hanging bracket 44. For example, in one embodiment the width of the first and second plate members 26, 28 is greater in a central portion 74 than adjacent the upper and lower ends 30, 32. The upper and lower ends 30, 32 include countersunk apertures 76 configured to receive a bolt 78 or other connector. The bolts 78 may also be disposed through respective cylindrical spacers 80 and may be capped with nuts 82, the bolts 78 and nuts 82 configured to lie flush with a lateral surface of the first and second plate members 26, 28. After placement of the bolts 78, spacers 80, and nuts 82, the hanging bracket 44 may be positioned inboard of the display bracket 42, and more specifically, between the first and second sidewalls 46, 48, as shown in FIGS. 2 and 4 and discussed in further detail below.

Returning to FIG. 3, the first and second plate members 26, 28 further include central apertures 84, pin apertures 86 above the central apertures 84, apertures 88 (e.g., non-circular apertures) below the central apertures 84, and degree scale indicator marks 90 above the pin apertures 86. When the hanging bracket 44 is positioned inboard of the display bracket 42, the central apertures 60 of the display bracket 42 may be aligned with the central apertures 84 of the hanging bracket 44. The pivot pin 62 is then inserted through each of the central apertures 60, 84 and locked in position with washers 92 and snap rings 94. The pin apertures 86 of the hanging bracket 44 may also be aligned with the first arcuate slots 64 of the display bracket 42. A guide pin 96 may be inserted through the pin apertures 86 and the first arcuate slots 64, and locked in position with washers 92 and snap rings 94. The display bracket 42 is thus pivotally connected to the hanging bracket 44 and may rotate with respect to the hanging bracket 44 to the extent the guide pin 96 slides along the first arcuate slots 64.

The non-circular apertures 88 in the hanging bracket 44 may be aligned with the second arcuate slots 66 of the display bracket 42. A carriage bolt 98 having a partially non-circular head 100 complementary to the shape of the non-circular apertures 88 may be inserted through the non-circular apertures 88 and second arcuate slots 66. The carriage bolt 98 includes a threaded end 102 which is coupled with internal threads on a threaded knob 104. The carriage bolt 98 is configured to slide along the second arcuate slots 66 as the display bracket 42 pivots with respect to the hanging bracket 44. The threaded knob 104 may be tightened down on the threaded end 102 to effectively pinch or squeeze the first and second sidewalls 46, 48 of the display bracket 42 to the first and second plate members 26, 28 of the hanging bracket 44. This pinching effectively locks the display bracket 42 in position relative to the hanging bracket 44 and prevents pivoting of the respective brackets 42, 44. Although the non-circular apertures 88 and the non-circular head 100 of the carriage bolt 98 are shown with a square shape in the illustrated embodiment, it will be appreciated that alternative non-circular shapes may also be used in other embodiments such that the carriage bolt 98 is not permitted to rotate relative to the hanging bracket 44.

The operation of the degree scale indicator mark 90 is more clearly illustrated in FIGS. 2 and 4. As shown, the degree scale indicator mark 90 may be viewed through the radial viewing slot 68 in the first sidewall 46 of the display bracket 42. The degree scale 70 provided around the radial viewing slot 68 allows a consumer to see the angle of tilt of the display bracket 42 and the flat panel display 24 relative to the wall 22. In FIG. 2, the degree scale indicator mark 90 is aligned with the zero degree reading on the degree scale 70 because the flat panel display 24 is generally parallel to the wall 22 in the mounted position. If the flat panel display 24 is bumped out of position, the consumer can use the degree scale 70 to return the flat panel display 24 to the optimal viewing orientation.

As previously discussed, the mounting brackets of conventional wall mounting devices included retractable screws or bolts along the respective lower ends for engagement with the bottom rail of the wall bracket. These retractable screws or bolts are difficult to access once the mounting brackets are engaged with the wall bracket, which may encourage improper mounting of the flat panel display. The wall mounting device 10 of the exemplary embodiment replaces this retractable screw or bolt with the aforementioned spring clip 36. The spring clip 36 provides advantages over the conventional wall mounting devices as will be described in greater detail below.

Figure 5:
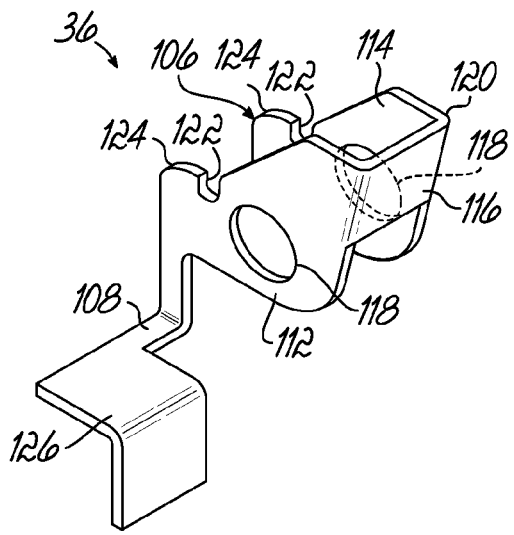
FIG. 5 is a perspective view of the left-handed retaining hook of the wall mounting device of FIG. 1.
Figure 6:
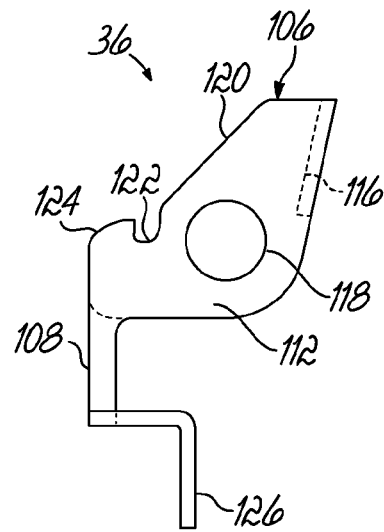
FIG. 6 is a side view of the left-handed retaining hook of FIG. 5.
Figure 7:
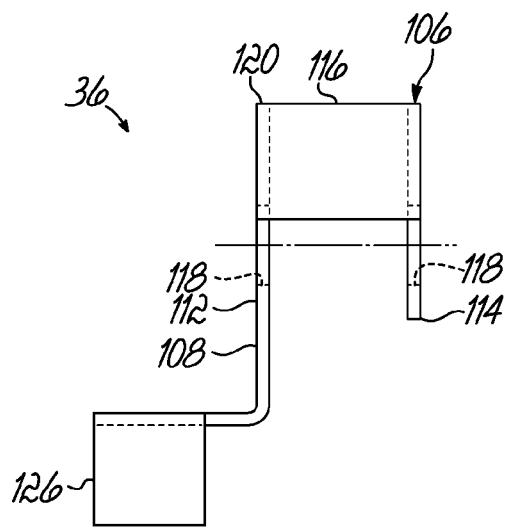
FIG. 7 is a front view of the left-handed retaining hook of FIG. 5.

The spring clip 36 is illustrated in more detail in the exploded assembly of FIG. 3 as well as FIGS. 5-7. The spring clip 36 includes a body member 106, a handle 108 extending from the body member 106, and a torsion spring 110. The body member 106 includes first and second generally opposed sidewalls 112, 114 and a front wall 116 extending between the first and second opposed sidewalls 112, 114. The front wall 116 is angled to follow the general contour of the front edge of the hanging bracket 44. The first and second sidewalls 112, 114 include mounting apertures 118 and may engage the cylindrical spacer 80 at the lower end 32 of the hanging bracket 44. The first and second sidewalls 112, 114 are disposed inboard of the first and second plate members 26, 28 of the hanging bracket 44 when the hanging bracket 44 is fully assembled. The body member 106 further includes an upper edge or surface 120 defining a locking slot 122 and a cam surface 124, the benefits of which will be described in detail below.

The handle 108 includes an L-shaped tab 126 extending from the first sidewall 112 of the body member 106 and below and outboard of the first plate member 26 of the hanging bracket 44. The L-shaped tab 126 provides a gripping surface for a consumer to rotate the spring clip 36 around a pivot axis X defined by the bolt 78 passing through the cylindrical spacer 30 and mounting apertures 118. The first plate member 26 of the hanging bracket 44 includes an abutment member 128 projecting in an inboard direction adjacent to the spring clip 36 (FIG. 3). The torsion spring 110 includes a first spring end 130 configured to engage the front wall 116 of the body member 106, a second spring end 132 configured to engage the abutment member 128 of the hanging bracket 44, and a spring coil 134 between the first and second spring ends 130, 132 and disposed around the cylindrical spacer 80 and pivot axis X. The torsion spring 110 resists compression of the first spring end 130 towards the second spring end 132, thereby biasing the upper surface 120 of the body member 106 around the pivot axis X in a generally upward direction as shown in FIGS. 2 and 4.

The operation of the spring clip 36 is illustrated in FIGS. 2 and 4. As will be described in detail below, the spring clip 36 operates in at least two operating modes: a manual operating mode and a snap-fit operating mode. As shown in FIG. 2, the spring clip 36 engages with the bottom rail 20 of the wall bracket 12 to couple the lower end 32 of the hanging bracket 44 to the wall bracket 12. In the engaged position, the locking slot 122 engages the downward projecting leg 20b of the bottom rail 20. As shown in FIG. 4, the hanging bracket 44 is coupled to the wall bracket 12 in the manual operating mode as follows: the hook 34 on the upper end 30 of the hanging bracket 44 is engaged with the top rail 18, and then the lower end 32 of the hanging bracket 44 is rotated towards the bottom rail 20 in the direction of arrow A. The handle 108 is pulled in the direction of arrow B such that the spring clip 36 is rotated downward against the spring bias. The consumer then moves the hanging bracket 44 to the position shown in FIG. 2 and releases the handle 108 to allow the spring to force the locking slot 122 upwards into engagement with the bottom rail 20.

Alternatively, handle 108 may not be manually rotated as shown in FIG. 4 as the lower end 32 of the hanging bracket 44 approaches the wall bracket 12. In this snap-fit operating mode, the bottom rail 20 will engage the cam surface 124 of the spring clip 36 and will slide along the cam surface 124 until the bottom rail 20 slips into the locking slot 122. As the bottom rail 20 slides along the cam surface 124, the locking clip 36 is forced into rotation against the spring bias similar to the previously-described manual rotation. Consequently, the spring clip 36 can be snapped onto the bottom rail 20 to properly assemble the wall mounting device 10 even if the consumer does not manually actuate the handle 108.

When the flat panel display 24 needs to be removed from the wall 22, the steps above are reversed: the handle 108 is rotated against the spring bias to disengage the spring clip 36 from the bottom rail 20, the lower end 32 of the hanging bracket 44 is rotated away from the bottom rail 20, and the hook 34 on the upper end 34 of the hanging bracket 44 is lifted off the top rail 18. It will be appreciated that removal of the flat panel display 24 from the wall 22 requires manual rotation of the spring clip 36 to ensure that the locking slot 122 remains engaged with the downward extending leg 20b of the bottom rail 20 while the flat panel display 24 is in the mounted position. In the exemplary embodiment, the spring clip 36 may provide approximately sixty pounds of holding force against the wall bracket 12. However, it will be appreciated that varying amounts of holding force may be provided by the spring clip 36 in alternative embodiments. Because the L-shaped tab 126 of the handle 108 acts as a lever arm away from the torsion spring 110, the consumer only needs to apply a minimal force to the handle 108 to disengage the spring clip 36 from the bottom rail 20. For example, the minimal force may be approximately five pounds in the exemplary embodiment.

Figure 8:
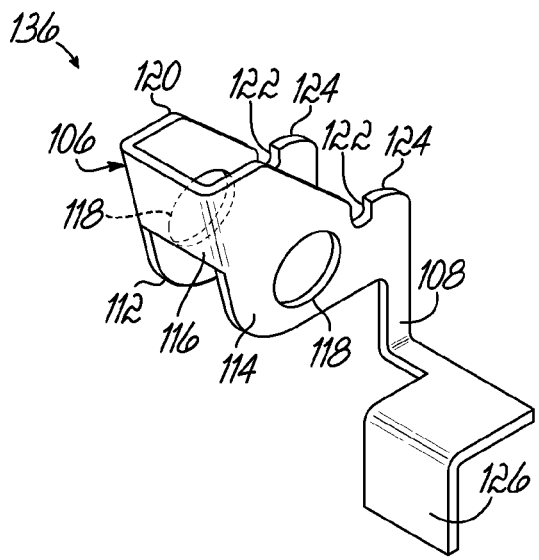
FIG. 8 is a perspective view of the right-handed retaining hook of the wall mounting device of FIG. 1.

As described previously, flat panel displays 24 typically require two mounting brackets 14 on the wall bracket 12. An alternative embodiment of a spring clip 136 is illustrated in FIG. 8 for a second mounting bracket 14. The only difference between the spring clip 136 of FIG. 8 from the spring clip 36 of the previous embodiment is that the handle 108 and L-shaped tab 126 extend from the second sidewall 114 of the body member 106 rather than the first sidewall 112. Advantageously, the spring clip 36 of FIG. 5 may be placed on the left side of the flat panel display 24 and the spring clip 136 of FIG. 8 may be placed on the right side of the flat panel display 24 so that each handle 108 may be easily reached or accessed from the sides of the flat display panel 24. The wall mounting device 10 therefore provides easy engagement and disengagement of the mounting bracket 14 from the wall bracket 12.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. For example, the wall mounting device 10 may be utilized to mount large pictures or works of art on a wall 24 instead of the aforementioned flat panel displays 24. The various features of the invention may be used alone or in any combination depending on the needs and preferences of the user.

What is claimed is:

1. A wall mounting device for a flat panel display, comprising:
    a wall bracket adapted to be directly coupled to a wall and including a top rail and a bottom rail; and
    a mounting bracket adapted to be coupled to the flat panel display, the mounting bracket including first and second plate members connected to each other, the mounting bracket having upper and lower ends, the upper end including a hook adapted to engage the top rail, the lower end including a spring clip adapted to be selectively coupled to the bottom rail,
    wherein the spring clip further comprises a body member, a handle extending from the body member, and a torsion spring adapted to engage the body member, the body member including an upper surface defining a locking slot adapted to engage the bottom rail of the wall bracket,
    wherein the mounting bracket further includes a cylindrical spacer coupled between the first and second plate members, and the body member of the spring clip further includes first and second opposed sidewalls and a front wall extending between the first and second opposed sidewalls, the first and second opposed sidewalls disposed between the first and second plate members of the mounting bracket and including a mounting aperture for engaging the cylindrical spacer on the mounting bracket, and
    wherein the mounting bracket includes an abutment member projecting from one of the first or second plate members, and the torsion spring of the spring clip further comprises:
        a first spring end engaging the front wall of the body member;
        a second spring end engaging the abutment member of the mounting bracket; and
        a spring coil extending between the first and second spring ends and disposed around the cylindrical spacer of the mounting bracket.

2. The wall mounting device of claim 1, wherein the handle of the spring clip comprises an L-shaped tab extending below one of the first or second opposed sidewalls and laterally beyond a space defined between the first and second plate members of the mounting bracket.

3. The wall mounting device of claim 1, wherein the upper surface of the body member further includes a cam surface extending in a rearward direction behind the locking slot and configured to guide the bottom rail of the wall bracket into engagement with the locking slot.

4. The wall mounting device of claim 1, wherein the torsion spring biases the locking slot towards the bottom rail of the wall bracket.

5. A wall mounting device for a flat panel display, comprising:
    a wall bracket adapted to be directly coupled to a wall and including a top rail and a bottom rail; and
    a mounting bracket adapted to be coupled to the flat panel display, the mounting bracket comprising:
        a display bracket including first and second sidewalls and a front mounting surface extending between the first and second sidewalls, the front mounting surface including apertures configured to receive threaded connectors that engage the flat panel display, the display bracket also including first and second arcuate slots in the first and second sidewalls;
        a hanging bracket including first and second plate members connected to each other and disposed between the first and second sidewalls of the display bracket, the hanging bracket further including upper and lower ends, the upper end including a hook adapted to engage the top rail, the lower end including a spring clip adapted to be selectively coupled to the bottom rail, the hanging bracket also including a pin aperture in the first and second plate members and a non-circular aperture in the first and second plate members;
        a pivot pin coupled to and extending between the first and second sidewalls of the display bracket and the first and second plate members of the hanging bracket, wherein the display bracket rotates with respect to the hanging bracket about the pivot pin, wherein the first and second arcuate slots in the display bracket are each centered at the pivot pin;
        a guide pin engaged with the first arcuate slot and the pin aperture, the guide pin sliding along the first arcuate slot to guide the display bracket during rotation with respect to the hanging bracket;
        a carriage bolt having a non-circular head engaged with the non-circular aperture and configured to slide along the second arcuate slot; and
        a threaded knob coupled to the carriage bolt and configured to tightly couple the display bracket and the hanging bracket to lock the display bracket in position and prevent additional pivoting.

* * * * *